(12) United States Patent
Haimer

(10) Patent No.: US 9,943,912 B2
(45) Date of Patent: Apr. 17, 2018

(54) TOOL HOLDER AND METHOD FOR PRODUCING A TOOL RECEIVING PORTION FOR SUCH A TOOL HOLDER

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 204 days.

(21) Appl. No.: 14/369,124

(22) PCT Filed: Dec. 20, 2012

(86) PCT No.: PCT/EP2012/076410
§ 371 (c)(1),
(2) Date: Jun. 26, 2014

(87) PCT Pub. No.: WO2013/098192
PCT Pub. Date: Jul. 4, 2013

(65) Prior Publication Data
US 2015/0028548 A1    Jan. 29, 2015

(30) Foreign Application Priority Data

Dec. 27, 2011   (DE) .................... 20 2011 109 498 U
Oct. 30, 2012   (DE) ........................ 10-2012 110 392

(51) Int. Cl.
*B23B 31/20*     (2006.01)
*B23B 31/107*    (2006.01)
(Continued)

(52) U.S. Cl.
CPC ............. *B23B 31/107* (2013.01); *B22F 3/02* (2013.01); *B22F 3/105* (2013.01); *B23B 31/005* (2013.01);
(Continued)

(58) Field of Classification Search
CPC ... B23B 31/005; B23B 31/02; B23B 31/1179; B23B 31/202; B23B 31/305;
(Continued)

(56) References Cited

U.S. PATENT DOCUMENTS 2,367,998 A  †  1/1945  Clarkson
3,136,561 A  *  6/1964  McAuliffe ............ B23B 31/202
                                                      279/46.4
(Continued)

FOREIGN PATENT DOCUMENTS

CH     401803    5/1966
DE     846952    8/1952
(Continued)

OTHER PUBLICATIONS

Opposition dated Jan. 23, 2015 to DE 10 2006 062 973.
(Continued)

*Primary Examiner* — Daniel Howell
*Assistant Examiner* — Paul M Janeski
(74) *Attorney, Agent, or Firm* — Paul D. Bianco; Gary S. Winer; Fleit Gibbons Gutman Bongini & Bianco PL

(57) ABSTRACT

A tool holder with a main part, a deformable receiving portion for clamping a tool, and at least one blocking element which is designed to engage into a corresponding counter element on the tool in order to prevent the tool from moving axially out of the tool holder. The at least one blocking element is integrally formed with the receiving portion. A clamping system having such a tool holder and a method for producing a receiving portion for such a tool holder are also described.

20 Claims, 5 Drawing Sheets

(51) Int. Cl.
| | |
|---|---|
| *B23B 31/00* | (2006.01) |
| *B23B 31/02* | (2006.01) |
| *B23B 31/117* | (2006.01) |
| *B23B 31/30* | (2006.01) |
| *B22F 3/02* | (2006.01) |
| *B22F 3/105* | (2006.01) |
| *B23H 3/00* | (2006.01) |
| *B28B 1/00* | (2006.01) |
| *B28B 3/00* | (2006.01) |

(52) U.S. Cl.
CPC ............ *B23B 31/02* (2013.01); *B23B 31/117* (2013.01); *B23B 31/1179* (2013.01); *B23B 31/20* (2013.01); *B23B 31/202* (2013.01); *B23B 31/305* (2013.01); *B23H 3/00* (2013.01); *B28B 1/001* (2013.01); *B28B 3/00* (2013.01); *B23B 2231/026* (2013.01); *B23B 2260/026* (2013.01); *B23B 2260/112* (2013.01); *Y10T 29/49995* (2015.01); *Y10T 279/1241* (2015.01); *Y10T 279/17316* (2015.01); *Y10T 279/17761* (2015.01)

(58) Field of Classification Search
CPC ........ B23B 2231/026; B23B 2260/026; B23B 2260/112; B23B 31/107; B23B 31/117; B23B 31/20; Y10T 29/49995; Y10T 279/1241; Y10T 279/17316; Y10T 279/17761; B23H 3/00; B22F 3/02; B22F 3/105; B28B 1/001; B28B 3/00
See application file for complete search history.

(56) References Cited

U.S. PATENT DOCUMENTS

| | | | |
|---|---|---|---|
| 3,719,367 | A | 3/1973 | Baturka |
| 4,377,292 | A | 3/1983 | Staron |
| 4,536,109 | A | 8/1985 | Hunger |
| 5,234,296 | A | 8/1993 | Presby |
| 5,286,042 | A * | 2/1994 | Laube ............... B23B 29/03421 279/133 |
| 5,314,198 | A * | 5/1994 | Kanaan ................ B23B 31/026 279/133 |
| 5,516,243 | A * | 5/1996 | Laube ............... B23B 29/03421 279/2.08 |
| 5,556,399 | A | 9/1996 | Huebner |
| 6,077,003 | A * | 6/2000 | Laube .................. B23B 31/006 279/103 |
| 6,311,987 | B1 * | 11/2001 | Rinne ..................... B23B 31/22 279/2.08 |
| 7,938,408 | B2 | 5/2011 | Haimer |
| 7,967,300 | B2 * | 6/2011 | Andre .................. B23B 31/025 279/2.08 |
| 8,029,216 | B2 | 10/2011 | Guy |
| 8,505,893 | B2 | 8/2013 | Haimer |
| 2003/0210963 | A1 | 11/2003 | Kakai |
| 2005/0238451 | A1 | 10/2005 | Hartman |
| 2007/0231094 | A1 * | 10/2007 | Guy ..................... B23B 31/005 408/239 R |
| 2007/0246899 | A1 | 10/2007 | Haimer |
| 2008/0179838 | A1 * | 7/2008 | Retzbach ............. B23B 31/305 279/2.08 |
| 2011/0198818 | A1 | 8/2011 | Haimer |
| 2013/0307230 | A1 | 11/2013 | Haimer |
| 2013/0328275 | A1 | 12/2013 | Haimer |

FOREIGN PATENT DOCUMENTS

| | | |
|---|---|---|
| DE | 920336 | 11/1954 |
| DE | 1008085 | 10/1957 |
| DE | 7513937 U1 | 9/1975 |
| DE | 3911159 A1 | 10/1990 |
| DE | 3939423 A1 | 6/1991 |
| DE | 4010597 A1 | 10/1991 |
| DE | 4222809 A1 | 1/1993 |
| DE | 92 01 729 | 6/1993 |
| DE | 9201729 | 7/1993 |
| DE | 29708384 U1 | 10/1997 |
| DE | 19963657 A1 | 12/1999 |
| DE | 10100024 A1 | 3/2001 |
| DE | 10129501 A1 | 6/2001 |
| DE | 69715654 T2 | 3/2003 |
| DE | 202004010714 U1 | 9/2004 |
| DE | 102004042770 | 12/2005 |
| DE | 102006062973 B3 | 4/2006 |
| DE | 102006028408 | 10/2007 |
| DE | 102006028408 A1 | 10/2007 |
| DE | 102008039197 A1 | 8/2008 |
| DE | 102008039197 | 2/2010 |
| DE | 112008000350 T5 | 2/2010 |
| DE | 102011106421 B3 | 7/2011 |
| DE | 202012013200.8 | 3/2012 |
| EP | 1029620 | 8/2000 |
| EP | 1029620 A2 | 8/2000 |
| EP | 1346787 | 9/2003 |
| EP | 2001624 | 12/2008 |
| EP | 2749367 A1 | 3/2012 |
| EP | 2749367 | 7/2014 |
| FR | 1272885 | 9/1961 |
| FR | 1272885 A | 9/1961 |
| JP | 489527801 | 2/1947 |
| JP | 55175010 | 2/1954 |
| JP | S48-95278 | 2/1972 |
| JP | S4895278 | 2/1972 |
| JP | S5914121 | 4/1984 |
| JP | 6161106 | 4/1986 |
| JP | 6335521 U1 | 8/1986 |
| JP | 05318208 | 12/1993 |
| JP | 07308809 | 11/1995 |
| JP | 198616204 U1 | 1/1996 |
| JP | 911007 | 1/1997 |
| JP | H09216107 A2 | 8/1997 |
| JP | 101000009 U1 | 4/1998 |
| JP | H10100009 A2 | 4/1998 |
| JP | 20019612 A2 | 1/2001 |
| JP | 2002355727 A1 | 10/2002 |
| JP | 2005318208 | 11/2005 |
| JP | 2007308809 | 11/2007 |
| JP | 001430001 | 12/2011 |
| JP | D1430001 † | 12/2011 |
| WO | 9919598 A1 | 1/1990 |
| WO | 9513905 A1 | 11/1993 |
| WO | 9604089 A2 | 2/1996 |
| WO | 0189758 A1 | 11/2001 |
| WO | 2007/113797 A1 † | 10/2007 |
| WO | 2007113797 A1 | 10/2007 |
| WO | 2007118626 | 10/2007 |
| WO | 2007118626 A1 | 10/2007 |
| WO | 2011095965 A1 | 8/2011 |

OTHER PUBLICATIONS

English translation of Written Opinion, dated Jun. 2014, for PCT/EP2012/076410 filed Dec. 12, 2012.
English translation of the International Preliminary Report on Patentability dated Jul. 1, 2014 for PCT/EP2012/076410 filed on Dec. 12, 2012s.
International Search Report dated Mar. 22, 2013 for PCT/EP2012/076410.
Written Opinion for PCT/2012/076410, filed Dec. 20, 2012.
Results of search report for DE202011109498.
Results of search report for DE102012110392.
International Search Report for PCT/EP2012/076410 dated Mar. 22, 2013.
Written Opinion dated Mar. 22, 2013 for PCT/2012/076410, filed Dec. 20, 2012.

* cited by examiner
† cited by third party

TOOL HOLDER AND METHOD FOR PRODUCING A TOOL RECEIVING PORTION FOR SUCH A TOOL HOLDER

FIELD OF THE DISCLOSURE

This invention relates to a tool holder for clamping tools by friction. The invention also relates to a clamping system with a tool holder of this kind, and also to a method for producing a tool receiving portion for such a tool holder.

BACKGROUND OF THE DISCLOSURE

Already known from WO 2007/118626 A1 is a tool holder with an expansion sleeve deployed within a main part, the expansion sleeve being formed to receive a tool and capable of being compressed with hydraulic fluid to clamp the tool in place. The tool holder further includes a safety catch that contains multiple corresponding counter elements to engage with the blocking elements deployed in the main part, in order to prevent the axial slippage of the tool during the processing. In this known tool holder, the blocking elements are realized as bolts or balls that can slide into corresponding drilled holes in the main part, and engage with corresponding clamping grooves on the shank of a tool to be clamped. In this tool holder, however, the main part must be handled in a time-consuming way to release the blocking elements.

SUMMARY OF THE DISCLOSURE

The disclosure produces a tool holder of the above-described kind, as well as a clamping system with such a tool holder, that is simpler to produce and easy to assemble.

Preferred refinements and advantageous configurations of the invention are also disclosed.

In the tool holder of this invention, the at least one blocking element is formed integrally with the receiving portion. As a result, the receiving portion can easily be fitted together with the blocking elements. In addition, the blocking element does not take any space away from the receiving portion. The entire available space can be used by the receiving portion, so that there is no loss of clamping force.

The clamping system of the invention comprises a tool holder and a tool, the tool holder comprising a main part, a deformable receiving portion for clamping a tool, and at least one blocking element formed integrally with the receiving portion, which engages with a corresponding counter element to prevent the tool from slipping axially out of the tool holder.

In an especially preferred embodiment, the receiving portion is an expansion sleeve deployed in a receiving opening of the main part and subject to external pressure with hydraulic fluid, on the inner side of which is deployed the at least one blocking element.

The receiving portion can however also be a contracting chuck, a rolling power chuck, a reducing sleeve deployed within a clamping chuck, or a collet chuck that can be deformed by a clamping element and deployed within a receiving opening of the main part, on the inner side of which is deployed the at least one blocking element; or another frictional clamping system.

In an embodiment that is both advantageous in production terms and easy to assemble, the at least one blocking element can be formed directly on the receiving portion. The blocking element can, however, in the case of an expansion sleeve, also be a separate component implemented as a ball, bolt, etc., fastened to the expansion sleeve.

The receiving portion can be produced from ceramic, metal, or a mixture of the two.

For direct forming of the blocking element on the receiving portion, the receiving portion according to this invention is preferably produced from a metallic solid material by a material-removal method by producing a recess; in the production of the recess to form the blocking element that is formed integrally with the receiving portion, at least one protrusion projecting into the recess is left out. The blocking element is thus formed as one unit with the receiving portion. The spark erosion method, as well as the method known under the abbreviation EDM ("electrical discharge machining") and/or electrochemical removal methods like that known under the abbreviation ECM ("electrochemical machining"), or a combination thereof, such as ECDM ("electrochemical discharge machining"), have been found to be especially advantageous for producing the receiving portion from a metallic solid. With such metal-removing methods, the complex structures for forming projections that project inward within the receiving portion, and which form the blocking elements of the invention, can be produced. Thus, for the production of the recess in a solid block, machining methods can first be applied in a first processing step, and material-removing spark erosion methods, as are known under the abbreviation EDM ("electrical discharge machining"), and/or electrochemical removal methods, in a concluding processing step, whereby the fine structures can then be shaped for forming the projections in the recess that form the blocking elements. Obviously, the recess can also be produced entirely by means of machining methods.

In an especially advantageous embodiment, the at least one blocking element is realized in the receiving portion as a projection that stretches inward to engage with the corresponding recess on the shank of a tool to be clamped; this projection being preferably formed integrally with the receiving portion, and, as described above, produced in a recess of a solid block via a material-removing spark erosion method and/or an electrochemical removal method. Likewise, the block element furnished in the receiving portion could, however, also be realized as a recess, the corresponding counter element on the tool could be realized as a projection. The blocking element can have a semi- or partially-circular-shaped cross section for more straightforward engagement with the corresponding counter element.

In a preferred manner, the at least one blocking element can extend over at least a partial circumference of the receiving portion on the inner side thereof, in the manner of a female thread. A more even mounting along the circumference can be achieved by deploying multiple blocking elements along at least a partial circumference of the receiving portion, in the manner of a female thread. In the case of multiple blocking elements, the blocking elements are preferably set apart at equal angles in the peripheral direction within the receiving portion.

In an alternative method of production, the receiving portion can also be produced from ceramic or metal powder by compression molding or laser sintering.

BRIEF DESCRIPTION OF THE DRAWINGS

Additional distinguishing characteristics and advantages of the invention will be apparent from the following description of a preferred embodiment with reference to the drawings. The drawings are as follows.

DETAILED DESCRIPTION OF THE DISCLOSURE

Figure 1:
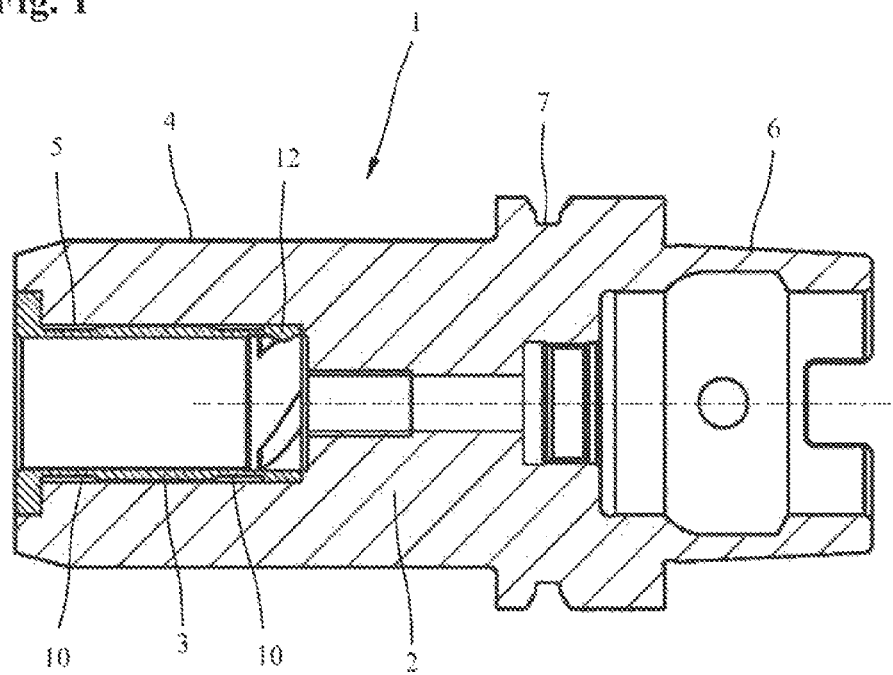
FIG. 1 a tool holder with an expansion sleeve for hydraulic clamping of a tool, in a longitudinal section view.

FIG. 1 shows a longitudinal section of a tool receiving portion 1, shown here as a hollow-taper-shank (HSK) tool receiving portion, with a rotationally symmetric main part 2 and an expansion sleeve 3 deployed within the main part 2 to receive the cylindrical shank of a tool, not shown here. The main part 2 has a cylindrical front part 4 with a receiving opening 5 for the expansion sleeve 3 and a conical rear part 6 for accommodating the work spindle of a machine tool. Between the cylindrical front part 4 and the conical rear part 6 is furnished a gripper groove 7 on the outer side of the main part 2.

Figure 2:
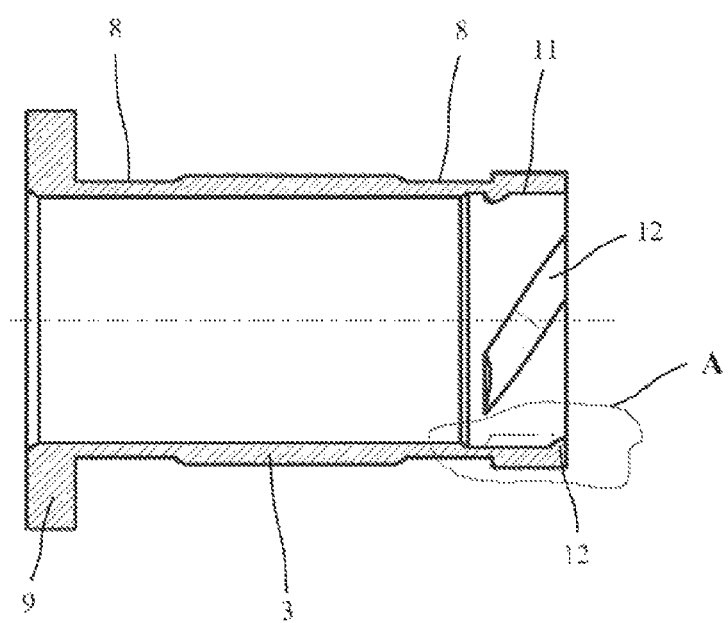
FIG. 2 enlarged partial view of the expansion sleeve of FIG. 1.
Figure 3:
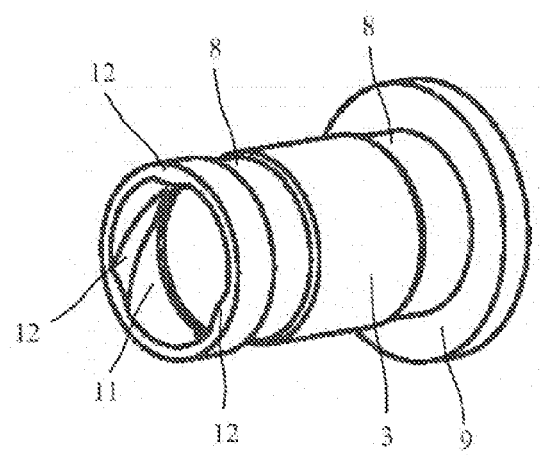
FIG. 3 perspective view of the expansion sleeve.

The expansion sleeve 3 shown separately in FIG. 2 has on its exterior two circumferential recesses 8 set apart from one another, and a coil 9 on its front end. Between the recesses 8 and the interior wall of the main part 2 in the vicinity of the receiving opening 5, the pressure chambers 10 shown in FIG. 1 are delimited to receive hydraulic fluid. The expansion sleeve 3 is preferably fastened to the main part 2 at the front and back ends of the sleeve. It can be soldered thereto or fastened to the main part 2 in another way. The pressure chambers 10 are e.g. connected to a pressure space deployed within the main part 2 via channels not shown here, also within the main part 2, the volume of the pressure space being adjustable e.g. by a partition that can be moved by a screw. By moving the partition by means of the screw, the pressure of the hydraulic fluid in the pressure space and pressure chambers 10 can be elevated, thereby pushing the expansion sleeve 3 inward radially. Through this arrangement, which is well-known and therefore not shown, the expansion sleeve 3 is uniformly pressed against the cylindrical shank introduced into the expansion sleeve 3, thus enabling a centric clamping over the full surface, with a high level of clamping force.

Figure 7:
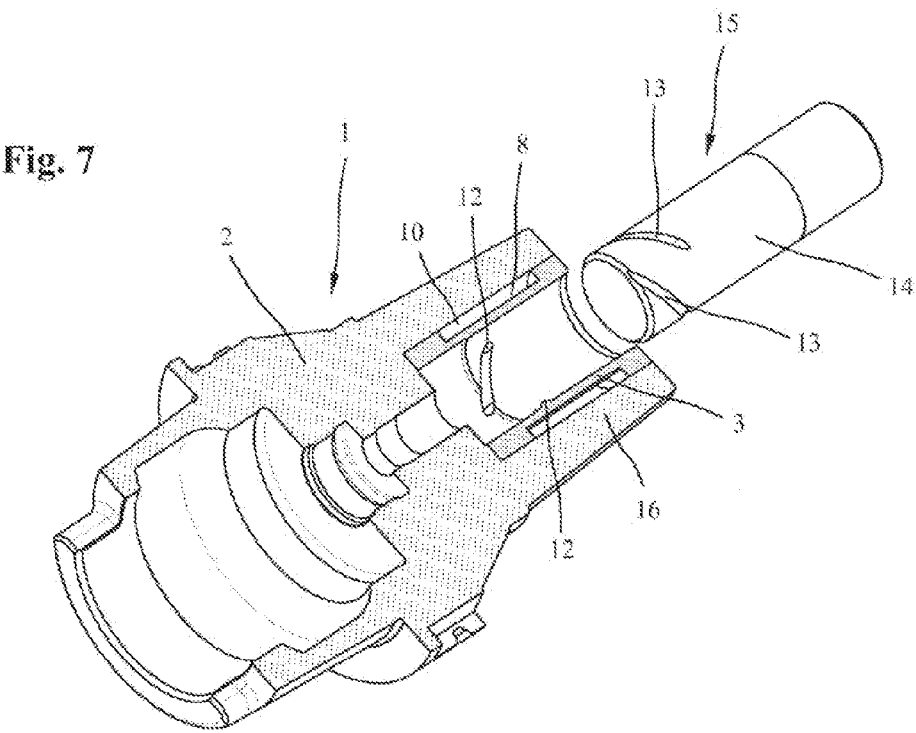
FIG. 7 partial perspective view of a first embodiment of a clamping system with tool holder, expansion sleeve and tool.

On the interior side of the expansion sleeve 3 are furnished inward-projecting blocking elements 12 in a back region 11 with an expanded inner diameter, which run in the manner of a female thread and arrive at a cylindrical shank 14 of a tool 15, shown in FIG. 7, to engage with a corresponding counter element 13. The counter elements 13 are realized in the manner of a male thread. By means of the blocking elements 12 that engage with the corresponding counter element 13 on the tool 15, a safety catch is formed that prevents e.g. axial slippage of the tool 15 due to e.g. vibration during processing.

Figure 4:
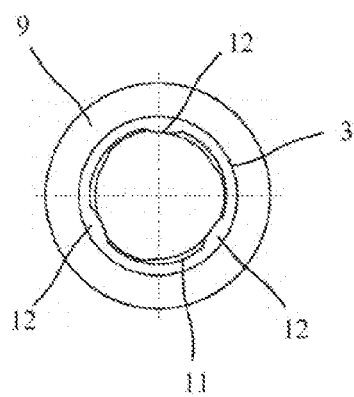
FIG. 4 view of the expansion sleeve from behind.
Figure 5:
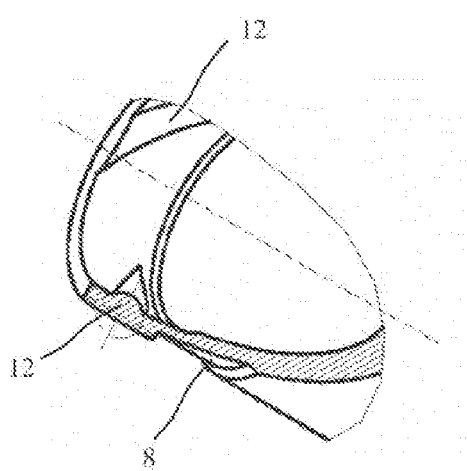
FIG. 5 detail view of the expansion sleeve in a partial cutaway view.
Figure 6:
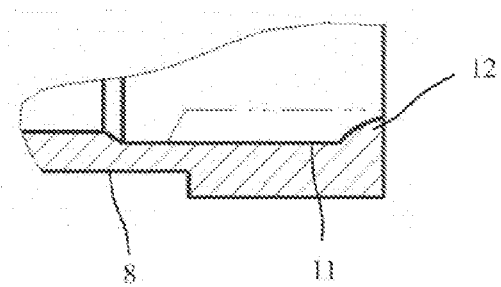
FIG. 6 detail A of FIG. 2.

In the embodiment shown, the blocking elements 12 are realized as projections running helically in the peripheral direction, with a semicircular cross section. As evident from FIG. 4, in the embodiment, there are furnished three projections set apart at equal angles in the peripheral direction, in the form of female threads as blocking elements 12 that run in the manner of a triple inner female thread with a pitch angle on the inner wall of the expansion sleeve 3. The counter elements that fit into the blocking elements 12 are formed as clamping grooves that run helically, in the manner of a triple male thread on the exterior of the cylindrical shank 14 of a tool 15, along the circumferential surface starting on the rear face.

The expansion sleeve 3 is preferably produced according to the method of the invention from a solid metallic block (e.g. a solid cylinder) by producing a recess by means of a material-removing spark erosion process (like e.g. EDM or ECDM); the blocking elements 12, as projections extending inward in the cylindrical recess, are omitted in forming the recess.

To grip a tool in the tool holder 1, the tool must first be turned upon introduction into the tool holder 1 in such a way that the blocking elements 12 on the expansion sleeve 3 are able to engage with the corresponding counter elements 13 on the tool 15. The expansion sleeve 3 can then be compressed from outside with hydraulic fluid. By means of this pressure, the expansion sleeve 3 is pressed inward, clamping the tool 15. Axial slippage of the tool 15 out of the tool holder 1 can be prevented via the positive-fit engagement of the blocking elements 12 in the corresponding counter elements 13.

FIG. 7 shows a clamping system with a tool holder 1, an expansion sleeve 3, and a tool 15 formed e.g. as a cutter or drill. In distinction from the embodiment of FIGS. 1-6, the expansion sleeve 3 has on its exterior only a recess 8 for forming a pressure chamber 10. Also furnished in this embodiment are inward-extending blocking elements 12 on the interior of the expansion sleeve 3, in the form of helically running projections for engaging with the counter elements 13 on the shank 14 of a tool 15, which are realized as clamping grooves.

Figure 8:
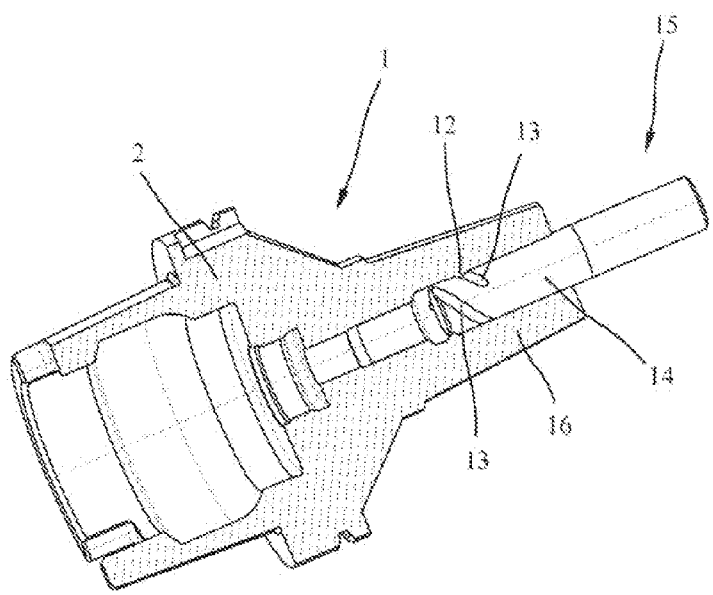
FIG. 8 partial perspective view of a second embodiment of a clamping system with tool holder and tool.

FIG. 8 shows a clamping system with a tool holder 1, and a tool 15 formed as a cutter or drill. In this embodiment, the receiving portion is formed as a contracting chuck 16 realized integrally with the main part 2. In such a tool holder 1, the contracting chuck 16 is heated by inductive heating, whereby the interior diameter of the contracting chuck 16 is expanded. While it is in a heated state, a tool 15 is inserted into the contracting chuck 16; the relationship of the inner diameter of the contracting chuck 16 to the outer diameter of the tool shank 14 is designed so that the tool 15 is held firmly in the contracting chuck 16 when the contracting chuck 16 is subsequently cooled. Furnished in this embodiment are inward-extending blocking elements 12 on the interior of the contracting chuck 16, in the form of helically running projections for engaging with the counter elements 13 on the shank 14 of a tool 15, which are realized as clamping grooves.

Figure 9:
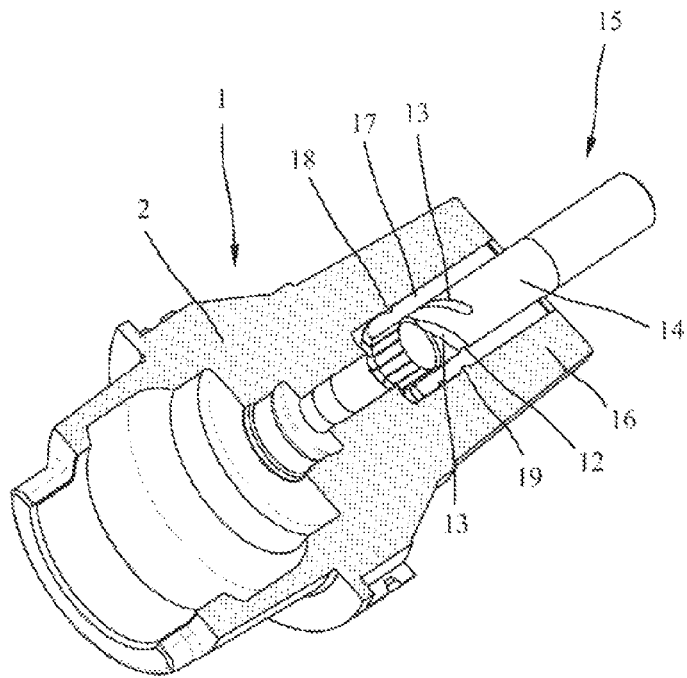
FIG. 9 partial perspective view of a third embodiment of a clamping system with tool holder, reducing sleeve and tool.

In a further embodiment shown in FIG. 9, the receiving portion is likewise realized as a contracting chuck 16, realized integrally with the main part 2. Here, the tool 15 is however clamped within the contracting chuck 16 via a reducing sleeve 17. The reducing sleeve 17 is formed in a known way as a slotted sleeve with multiple axial slots and an inner diameter adapted to the outer diameter of a tool shank 14. On its interior, the reducing sleeve 17 likewise has inward-extending blocking elements 12, in the form of helically running projections that engage with the counter elements 13 on the shank 14 of a tool 15, which are realized as clamping grooves. The reducing sleeve 17 further includes on its exterior clamping grooves 18 that run helically to engage with blocking elements 19 that are formed as projections projecting inward and running helically on the interior of the contracting chuck 16. By this means, a safety catch is realized for preventing the axial slippage of the reducing sleeve 17.

Figure 10:
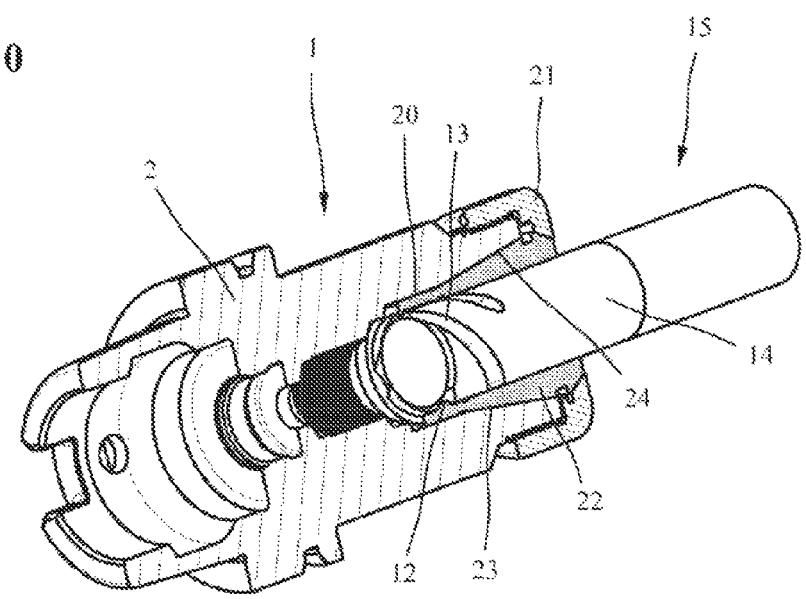
FIG. 10 partial perspective view of a fourth embodiment of a clamping system with tool holder, collet chuck, and tool.

FIG. 10 shows a further embodiment wherein the receiving portion is formed as a collet chuck 22 that can be deformed by a clamping element 21 and is deployed within a receiving opening 20 of the main part 2. The collet chuck 22 has an outer conical surface 23 for contacting an inner conical surface 24 of the receiving opening 20. The conical surfaces 23 and 24 are coordinated with one another in such a way that the collet chuck 22 can be compressed inward by axial displacement, and thereby grips the shank 14 of a tool 15. On its interior, the collet chuck 22 likewise has inward-extending blocking elements 12, in the form of helically running projections that engage with the counter elements 13 on the shank 14 of a tool 15, which are realized as clamping grooves. Axial displacement of the collet chuck 22 is achieved by means of the clamping element 21, that here is realized as a ring nut screwed onto an outside thread on the front end of the main part 2.

Figure 11:
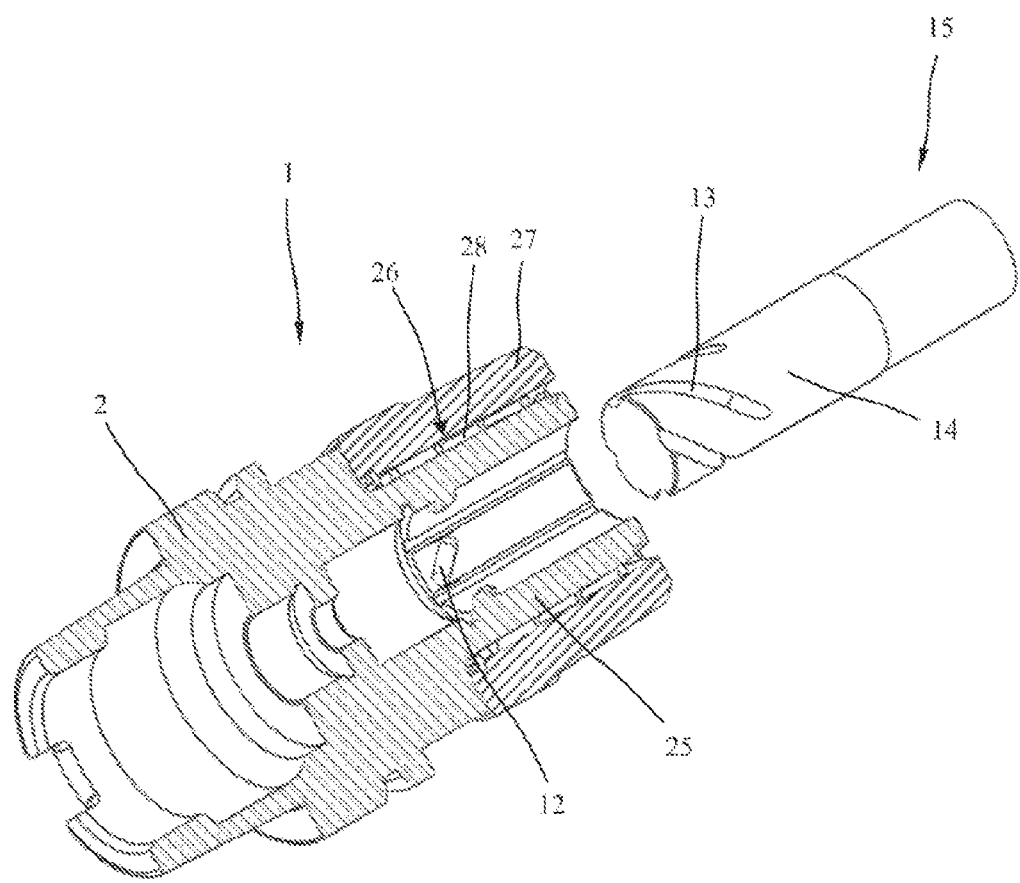
FIG. 11 partial perspective view of a fifth embodiment of a clamping system with tool holder, rolling power chuck, and tool.

The tool holder 1, in a further embodiment shown in FIG. 11, may also be realized as a rolling power chuck. The main part 2 has, in a front part, a clamping region 25 furnished with lengthwise slots, as a receiving portion for the shank 14 of the tool 15. In the deformable clamping region 25 is deployed a clamping nut 27 that is rotatably seated, usually by means of a needle bearing 26 or another ball bearing, by the rotation of which a clamping pressure can be brought to bear on the deformable clamping region 25. The needle bearings 28 seated within a bearing cage shift, when the clamping nut 27 is turned on the tapering inner surface of the clamping nut 27 and a narrowing outer surface of the deformable clamping region 25, in such a way that when the clamping nut 27 is tightened, the clamping nut 27 presses against the deformable clamping zone 25 via the needle bearings 28 to press the deformable clamping zone 25 against the shank 14 of the tool 15. In the embodiment shown, the inward-extending blocking elements 12 are likewise formed as helically-running projections for engaging with the counter elements 13 on the shank 14 of a tool 15, which are realized as clamping grooves. The clamping elements 12 are here deployed on the interior of the deformable clamping region 25. It is, however, also possible to deploy the blocking elements 12 further within the main part 2. In addition, a reducing sleeve, as shown in FIG. 9, could be deployed between the deformable clamping region 25 and the tool shank 14.

The invention is, of course, not limited to HSK tool holders. SK, JIS, BT, ABS, or Capto interfaces, and the like, can similarly be furnished on the main part 2.

The clamping elements do not necessarily have to be deployed in the deformable region of the receiving portion. They can also be in a non-deformable region or in the region of the base holder.

The invention claimed is:
1. A tool holder comprising:
   a main part;
   a deformable receiving portion for clamping a cylindrical shank of a tool, the deformable receiving portion having a first end and a second end; and
   at least two blocking elements formed integrally with the deformable receiving portion, the at least two blocking elements disposed extending helically along a portion of an interior surface of the deformable receiving portion such that each of the at least two blocking elements does not extend along an entire interior surface from the first end to the second end, the at least two blocking elements spaced apart from the first end and the second end of the deformable receiving portion and at equal angles on the interior surface of the deformable receiving portion; and
   wherein the at least two blocking elements are configured and arranged for engaging with corresponding counter elements on the cylindrical shank of the tool to form a connection in which the interior surface of the deformable receiving portion contacts an exterior surface of the cylindrical shank between blocking elements, the connection preventing axial slippage of the tool from the deformable receiving portion.

2. The tool holder according to claim 1, wherein the corresponding counter elements are disposed on the exterior surface of the cylindrical shank of the tool.

3. A clamping system comprising a tool and the tool holder of claim 2, in which the at least two blocking elements are engaged with the corresponding counter elements on the exterior surface of the tool forming a connection that prevents axial slippage of the tool from the deformable receiving portion.

4. The tool holder according to claim 1, wherein the deformable receiving portion is an expansion sleeve deployed in a receiving opening in the main part, the expansion sleeve configured and arranged to receive external pressure from hydraulic fluid.

5. The tool holder according to claim 4, wherein each of the blocking elements extends over at least a partial inner circumference of the expansion sleeve.

6. The tool holder according to claim 1, wherein the deformable receiving portion is a contracting chuck formed integrally with the main part.

7. The tool holder according to claim 6, further comprising a reducing sleeve deployed within the contracting chuck.

8. The tool holder according to claim 1, wherein the deformable receiving portion is a collet chuck deployed within a receiving opening of the main part, the collet chuck deformable by a clamping element.

9. The tool holder according to claim 1, wherein the deformable receiving portion is a clamping region formed on a front part of the main part, the clamping region deformable by a clamping nut on the main part and rotatable by a roller bearing.

10. The tool holder according to claim 1, wherein one of the at least two blocking elements is formed as an inwardly-extending projection.

11. The tool holder according to claim 1, wherein the at least two blocking elements are formed as inwardly-extending projections.

12. The tool holder according to claim 1, wherein each of the blocking elements has a semicircular or partially circular cross section.

13. The tool holder according to claim 1, wherein each of the blocking elements is a female thread and extends over at least a partial inner circumference of the deformable receiving portion.

14. The tool holder according to claim 1, further comprising additional blocking elements set apart from one another at equal angles in a peripheral direction on the interior surface of the deformable receiving portion.

15. The tool holder according to claim 1, wherein the deformable receiving portion is made of a material selected from the group consisting of ceramic, metal, and mixtures thereof.

16. A method for producing a deformable receiving portion for clamping a tool in a tool holder, the deformable receiving portion having integral blocking elements disposed extending helically and spaced apart at equal angles along an interior surface of the deformable receiving portion, the method comprising:

providing a solid, metallic material;

producing a recess in the solid, metallic material using a material-removing method;

forming projections in the recess by selectively removing material; and shaping the projections, thereby forming the integral blocking elements disposed extending helically and spaced apart at equal angles along an interior surface of the deformable receiving portion.

17. The method according to claim 16, wherein the material-removing method is selected from the group consisting of a spark-erosion method, an electrochemical removal method, and combinations thereof.

18. A deformable receiving portion produced according to the method of claim 16.

19. A method for producing a deformable receiving portion for clamping a tool in a tool holder, the deformable receiving portion having integral blocking elements disposed extending helically and spaced apart at equal angles along an interior surface of the deformable receiving portion, the method comprising:

providing a ceramic powder, a metal powder, or mixture of ceramic and metal powders;

forming a solid material from the powder using a pressure molding method or a laser sintering method;

producing a recess in the solid material using a material-removing method;

forming projections in the recess by selectively removing material; and shaping the projections, thereby forming the integral blocking elements disposed extending helically and spaced apart at equal angles along an interior surface of the deformable receiving portion.

20. A deformable receiving portion produced according to the method of claim 19.

\* \* \* \* \*